United States Patent
Larios et al.

(10) Patent No.: US 12,104,050 B2
(45) Date of Patent: Oct. 1, 2024

(54) BICOMPONENT FIBER AND POLYMER COMPOSITION THEREOF

(71) Applicant: Dow Global Technologies LLC, Midland, MI (US)

(72) Inventors: Fabricio Arteaga Larios, Sugar Land, TX (US); Brian W. Walther, Clute, TX (US); Jill M. Martin, Pearland, TX (US); Ronald Wevers, Terneuzen (NL); Robert W. Bell, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 976 days.

(21) Appl. No.: 17/042,361

(22) PCT Filed: Mar. 27, 2019

(86) PCT No.: PCT/US2019/024236
§ 371 (c)(1),
(2) Date: Sep. 28, 2020

(87) PCT Pub. No.: WO2019/191197
PCT Pub. Date: Oct. 3, 2019

(65) Prior Publication Data
US 2021/0115237 A1  Apr. 22, 2021

Related U.S. Application Data

(60) Provisional application No. 62/649,952, filed on Mar. 29, 2018.

(51) Int. Cl.
C08L 23/30 (2006.01)
D01D 5/34 (2006.01)
D01F 1/10 (2006.01)
D01F 8/06 (2006.01)
D01F 8/12 (2006.01)
D01F 8/14 (2006.01)

(52) U.S. Cl.
CPC .............. C08L 23/30 (2013.01); D01D 5/34 (2013.01); D01F 1/10 (2013.01); D01F 8/06 (2013.01); D01F 8/12 (2013.01); D01F 8/14 (2013.01)

(58) Field of Classification Search
CPC ... C08L 23/30; D01D 5/34; D01F 1/10; D01F 8/06; D01F 8/12; D01F 8/14

USPC ...................................................... 428/373
See application file for complete search history.

(56) References Cited

U.S. PATENT DOCUMENTS

| | | |
|---|---|---|
| 5,082,899 A | 1/1992 | Sawyer et al. |
| 5,167,765 A | 12/1992 | Nielsen et al. |
| 5,372,885 A * | 12/1994 | Tabor ........................ D01F 8/14 |
| | | 428/374 |
| 5,540,992 A | 7/1996 | Marcher et al. |
| 5,948,529 A | 9/1999 | Hastie |
| 6,670,035 B2 | 12/2003 | Pittman et al. |
| 7,927,530 B2 | 4/2011 | Dahringer et al. |
| 8,895,459 B2 | 11/2014 | Dahringer et al. |
| 10,100,441 B2 | 10/2018 | Suzuki et al. |
| 2004/0102591 A1* | 5/2004 | Brookhart ............... C08L 23/02 |
| | | 560/205 |
| 2007/0173161 A1 | 7/2007 | Allgeuer et al. |
| 2013/0023177 A1 | 1/2013 | Claasen et al. |
| 2013/0090495 A1 | 4/2013 | Hutchings et al. |
| 2013/0190525 A1 | 7/2013 | Delaney et al. |
| 2014/0323003 A1 | 10/2014 | Richeson et al. |
| 2018/0256773 A1* | 9/2018 | Lindner .............. A61F 13/5116 |

FOREIGN PATENT DOCUMENTS

| | | | |
|---|---|---|---|
| EP | 0496734 | 8/1992 | |
| WO | WO-2012162130 A1 * | 11/2012 | ............. A61L 15/24 |
| WO | WO-2017110568 A1 * | 6/2017 | ............. C08K 13/02 |

OTHER PUBLICATIONS

International Search Report & Written Opinion for related PCT Application PCT/US2019/024236, mailed Jun. 7, 2019 (11 pgs).
International Preliminary Report on Patentability for related PCT Application PCT/US2019/024236, mailed Oct. 8, 2020 (7 pgs).

* cited by examiner

Primary Examiner — Peter Y Choi

(57) ABSTRACT

The present disclosure provides for a bicomponent fiber that includes a first region formed of a condensation polymer and a second region formed from a polyethylene blend. The polyethylene blend includes (i) an ethylene-based polymer having a density of 0.920 g/cm³ to 0.970 g/cm³ and a melt index, $I_2$, as determined by ASTM D1238 at 190° C. and 2.16 kg of 0.5 to 150 g/10 minutes; (ii) a maleic anhydride-grafted polyethylene; and (iii) an inorganic Brønsted-Lowry acid having an acid strength pKa value at 25° C. of 1 to 6.5, wherein the polyethylene blend has a 0.03 to 0.5 weight percent of grafted maleic anhydride based on the total weight of the polyethylene blend. The first region is a core region of the bicomponent fiber and the second region is a sheath region of the bicomponent fiber, where the sheath region surrounds the core region.

19 Claims, No Drawings

BICOMPONENT FIBER AND POLYMER COMPOSITION THEREOF

This application is a National Stage Application under 35 U.S.C. § 371 of International Application Number PCT/US2019/024236, filed Mar. 27, 2019 and published as WO 2019/191197 on Oct. 3, 2019, which claims the benefit to U.S. Provisional Application 62/649,952, filed Mar. 29, 2018, the entire contents of which are incorporated herein by reference in its entirety

TECHNICAL FIELD

The present disclosure relates generally to a fiber and more particularly to polymer compositions for a bicomponent fiber.

BACKGROUND

Bicomponent fibers are filaments made up of two different polymers that are extruded from the same spinneret with both polymers contained within the same filament. When the filament leaves the spinneret, it consists of non-mixed components that are fused at the interface. The two polymers differ in their chemical composition and/or physical property, which allows the bicomponent fiber to meet a wider variety of desired properties as the functional properties of both polymers can be joined into one filament.

Among the many configurations of bicomponent fibers, one very useful configuration is a core-sheath bicomponent fiber. For the core-sheath structure the core is fully surrounded by the sheath. So, a first polymer forms the core while a second polymer different than the first polymer forms the sheath. This allows for a variety of properties to be achieved from a single fiber structure. For example, the polymer for the core can be selected to impart strength to the bicomponent fiber (a reinforcing polymer), while the polymer for the sheath can be selected for its ability to be dyed, for it appearance, for its ability to provide insulation or for its adhesion properties, among others.

One issue that continues to trouble bicomponent fibers having a core-sheath structure, however, is the strength of the interfacial bond between the polymer of the core and the polymer of sheath. Experience has shown that core-sheath adhesion is a problem with bicomponent fibers having a core of polyethylene terephthalate (PET) and a sheath of a polyolefin. This is not surprising since PET and many polyolefins (e.g., polypropylene, polyethylene) are mutually incompatible. This incompatibility can lead to problems such as shedding of the sheath during carding. It is also possible for the core of PET to separate from the sheath of polyolefin during the post-spinning process steps.

As such, there remains in the art a need for improving the adhesion of a core of PET to a sheath of a polyolefin.

SUMMARY

The present disclosure provides for a bicomponent fiber that helps to improve the strength of the interfacial bond between the layers for the bicomponent fiber. For the various embodiment provided herein, the bicomponent fiber includes a condensation polymer (e.g., a polyester) in of a first region (e.g., the core) and a polyolefin blend in a second region (e.g., the sheath) of the bicomponent fiber, where the strength of the interfacial bond between the layers for the bicomponent fiber can be improved by the presence of a maleic anhydride-grafted polyethylene. For bicomponent fibers having polymers that suffer from incompatibility problems (e.g., PET core with polyolefin sheath), the present disclosure can help to improvement in the adhesion of the core to the sheath.

Specifically, the present disclosure provides for a bicomponent fiber that includes a first region formed of a condensation polymer, and a second region formed from a polyethylene blend. The polyethylene blend includes (i) an ethylene-based polymer having a density of 0.920 g/cm$^3$ to 0.970 g/cm$^3$ and a melt index, $I_2$, as determined by ASTM D1238 at 190° C. and 2.16 kg of 0.5 to 150 g/10 minutes; (ii) a maleic anhydride-grafted polyethylene; and (iii) an inorganic Brønsted-Lowry acid having an acid strength pKa value at 25° C. of 1 to 6.5, wherein the polyethylene blend has a 0.03 to 0.5 weight percent of grafted maleic anhydride based on the total weight of the polyethylene blend. For the various embodiments, the first region is a core region of the bicomponent fiber and the second region is a sheath region of the bicomponent fiber, where the sheath region surrounds the core region.

For the various embodiments, the condensation polymer is selected from the group consisting of polyethylene terephthalate, polyethylene terephthalate glycol-modified, polybutylene terephthalate, polylactic acid, polytrimethylene terephthalate, polyethylene 2,5-furandicarboxylate, polylaydroxybutyrate, polyamide and combinations thereof. In a preferred embodiment, the condensation polymer is selected from the group consisting of polyethylene terephthalate, polyethylene terephthalate glycol-modified, polybutylene terephthalate and combinations thereof. For the various embodiments, the condensation polymer comprises at least 75 weight percent (wt. %) of the first region, wherein the wt. % is based on the total weight of the first region.

For the various embodiments, the ethylene-based polymer is selected from linear low-density polyethylene, linear medium-density polyethylene, high-density polyethylene and combinations thereof. The maleic anhydride-grafted polyethylene has 0.05 to 3 wt. % of graphed maleic anhydride based on the total weight of the maleic anhydride-grafted polyethylene. For the various embodiments, the maleic anhydride-grafted polyethylene has a density in a range of 0.920 g/cm$^3$ to 0.959 g/cm$^3$ and a melt index, $I_2$, as determined by ASTM D1238 at 190° C. and 2.16 kg of 10 to 14 g/10 minutes. Preferably, the maleic anhydride-grafted polyethylene has a density in a range of 0.949 g/cm$^3$ to 0.959 g/cm$^3$ and a melt index, $I_2$, as determined by ASTM D1238 at 190° C. and 2.16 kg of 10 to 14 g/10 minutes.

For the various embodiments, the inorganic Brønsted-Lowry acid is selected from the group consisting of sodium bisulfate monohydrate, phosphoric acid and combinations thereof. Preferably, the inorganic Brønsted-Lowry acid has a pKa of 2 to 6.

By way of more specific examples, the polyethylene blend includes 5 to 75 wt. % of the ethylene-based polymer, 2 to 30 wt. % of the maleic anhydride-grafted polyethylene, and 20 to 10000 parts-per-million of the inorganic Brønsted-Lowry. The polyethylene blend can also include at least 75 wt. % of the ethylene-based polymer, where the maleic anhydride-grafted polyethylene and the inorganic Brønsted-Lowry acid are present with the ethylene-based polymer to provide 100 wt. % of the polyethylene blend.

The polyethylene blend can further include a polar saturated fatty acid having a 12 to 21 carbon chain and metal salts thereof. For the various embodiments, the polar saturated fatty acid can include stearic acid and metal salts thereof.

The present disclosure also provides for a method of forming the bicomponent fiber, which includes coextruding under thermally bonding conditions (a) the condensation polymer and (b) the polyethylene blend, where the polyethylene blend includes (i) an ethylene-based polymer having a density of 0.920 g/cm$^3$ to 0.965 g/cm$^3$ and a melt index, $I_2$, as determined by ASTM D1238 at 190° C. and 2.16 kg of 0.5 to 150 g/10 minutes; (ii) a maleic anhydride-grafted polyethylene; and (iii) an inorganic Brønsted-Lowry acid having an acid strength pKa value at 25° C. of 1 to 6.5. The polyethylene blend has a 0.03 to 0.5 weight percent of grafted maleic anhydride based on the total weight of the polyethylene blend. The condensation polymer and the polyethylene blend are contacted under thermally bonding conditions to form the bicomponent fiber having a first region with the condensation polymer and a second region with the polyethylene blend.

In one embodiment, the bicomponent fiber is prepared by coextruding (a) and (b) in a sheath/core configuration, and where (a) is selected from the group consisting of polyethylene terephthalate, polyethylene terephthalate glycol-modified, polybutylene terephthalate, polylactic acid, polytrimethylene terephthal ate, polyethylene 2,5-furandicarboxylate, polyhydroxybutyrate, polyamide and combinations thereof, and where the maleic anhydride-grafted polyethylene of the polyethylene blend has 0.05 to 3 wt. % of graphed maleic anhydride based on the total weight of the maleic anhydride-grafted polyethylene. The polyethylene blend can include 5 to 75 wt. % of the ethylene-based polymer, 2 to 30 wt. % of the maleic anhydride-grafted polyethylene, and 20 to 10000 parts-per-million of the inorganic Brønsted-Lowry. The polyethylene blend can further include a polar saturated fatty acid having a 12 to 21 carbon chain and metal salts thereof.

The bicomponent fiber can be formed under melt spinning, melt blown, spunbond or staple fiber manufacturing process conditions. The present disclosure also provides for a nonwoven article that includes the bicomponent fiber described herein.

DETAILED DESCRIPTION

The present disclosure provides for a bicomponent fiber that helps to improve the strength of the interfacial bond between the layers for the bicomponent fiber. For the various embodiment provided herein, the bicomponent fiber includes a condensation polymer (e.g., a polyester) in of a first region (e.g., the core) and a polyolefin blend in a second region (e.g., the sheath) of the bicomponent fiber, where the strength of the interfacial bond between the layers for the bicomponent fiber can be improved by the presence of a maleic anhydride-grafted polyethylene. For bicomponent fibers having polymers that suffer from incompatibility problems (e.g., PET core with polyolefin sheath), the present disclosure can help to improvement in the adhesion of the core to the sheath.

As discussed herein, the present disclosure is directed to bicomponent fibers, a method of producing bicomponent fibers, nonwoven materials comprising one or more such bicomponent fibers, and a method for making such nonwoven materials. The bicomponent fibers according to the present disclosure include a first region formed of a condensation polymer, and a second region formed from a polyethylene blend. The polyethylene blend includes (i) an ethylene-based polymer having a density of 0.920 g/cm$^3$ to 0.970 g/cm$^3$ and a melt index, $I_2$, as determined by ASTM D 1238 at 190° C. and 2.16 kg of 0.5 to 150 g/10 minutes; (ii) a maleic anhydride-grafted polyethylene; and (iii) an inorganic Brønsted-Lowry acid having an acid strength pKa value at 25° C. of 1 to 6.5, where the polyethylene blend has a 0.03 to 0.5 weight percent of grafted maleic anhydride based on the total weight of the polyethylene blend.

The bicomponent fibers of the present disclosure can contain the different polymer portions in any shape. Examples are core-sheath, side-by-side or island-in-the-sea configurations. Core-sheath configurations are preferred. The bicomponent fibers of the present disclosure can have a cross-section of either shape. Examples of cross sections are found in Hearle J., "Fibers, 2. Structure" (Ullmann's Encyclopedia of Industrial Chemistry, Wiley-VCH: 2002, 1-85). Examples of preferred cross-sections are circular, ellipsoidal, tri- or multiangled or tri- or multilobal. So, for the various embodiments, the first region can be a core region of the bicomponent fiber and the second region can be a sheath region of the bicomponent fiber, where the sheath region surrounds the core region. Other configurations for the biocomponent fiber as possible, as discussed herein. Specifically, the present disclosure refers to a "core" and "sheath" bicomponent fibers. The core and sheath bicomponent fibers of the present disclosure can be in a concentric configuration or an eccentric configuration, where the sheath completely surrounds the core. The bicomponent fibers of the present disclosure can also have a segmented pie configuration is known in the art. Other possible configurations include side-by-side bicomponent fiber configurations as are known.

As used herein, the term "copolymer" is meant to include polymers having two or more monomers, optionally with other monomers, and may refer to interpolymers, terpolymers, etc. The term "polymer" as used herein includes, but is not limited to, homopolymers, copolymers, terpolymers, etc. and alloys and blends thereof. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers.

The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and diene monomers.

"Polyethylene" as used herein includes homopolymers and copolymers of ethylene or mixtures thereof. Products that include one or more ethylene monomers polymerized with one or more additional monomers. "Ethylene-based," as used herein, is meant to include any polymer comprising ethylene, either alone or in combination with one or more comonomers, in which ethylene is the major component (e.g., greater than 50 wt. % ethylene). Likewise, "propylene-based", as used herein, is meant to include any polymer comprising propylene, either alone or in combination with one or more comonomers, in which propylene is the major component (e.g., greater than 50 wt. % propylene).

First Region

The bicomponent fiber includes a first region formed of a condensation polymer. As discussed herein, the first region can be a core region of the bicomponent fiber and the second region can be a sheath region of the bicomponent fiber, where the sheath region surrounds the core region. Polymers intended for the first region of the bicomponent fiber described herein include condensation polymers, which are polymers formed through a condensation reaction. Examples of such condensation polymers include melt-spinnable condensation polymers, which include those selected from the group consisting of polyethylene terephthalate, polyethylene terephthalate glycol-modified, polybutylene terephthalate, polylactic acid, polytrimethylene terephthal ate, polyethylene 2,5-furalidicarboxylate, polyhydroxybutyrate, polyamide and combinations thereof.

As seen above, the broad class of condensation polymers include polyesters, which are preferred for the first region of the biocomponent fiber. Preferably, the condensation polymer are polyesters selected from the group consisting of polyethylene terephthalate, polyethylene terephthalate glycol-modified, polybutylene terephthalate and combinations thereof. The recited polyesters of the present disclosure can also have a density in a range of 1.2 g/cm$^3$ to 1.5 g/cm$^3$. Preferably, the polyesters have a density in a range of 1.35 g/cm$^3$ to 1.45 g/cm$^3$. Such polyesters normally have a molecular weight equivalent to an intrinsic viscosity (IV) of 0.5 to 1.4 (dl/g), where the VI is determined according to ASTM D4603 or 2857.

For the various embodiment, the condensation polymer can comprise at least 75 weight percent (wt. %) of the first region, wherein the wt. % is based on the total weight of the first region. When less than 100 wt. % of the identified preferred polyesters recited above are used for the first region (e.g., polyethylene terephthalate), the remaining wt. % to achieve the 100 wt. % can be composed of, for example, dicarbonic acid units and glycol units which act as so-called modifiers and which enable the physical and chemical properties of the fiber produced to be influenced in a specific manner. Examples of such dicarbonic acid units are residues of isophthalic acid or of aliphatic dicarbonic acid, e.g. glutaric acid, adipinic acid, sabacic acid; examples of diol residues with a modifying action are those of longer chain diols, e.g. of propane diol or butane diol, of di- or triethylene glycol or, if available in a small quantity, of polyglycol with a molecular weight of 500 to 2000 g/mol. Particularly preferable for the first region are polyesters that contain at least 95 mol % of polyethylene terephthalate, particularly those of unmodified polyethylene terephthalate. Processing temperatures for forming the core from the polyesters, as discussed herein, can be from 200° C. to less than 350° C.

Second Region

The second region of the bicomponent fiber is formed from a polyethylene blend of (i) an ethylene-based polymer having a density of 0.920 g/cm$^3$ to 0.970 g/cm$^3$ and a melt index, $I_2$, as determined by ASTM D1238 at 190° C. and 2.16 kg of 0.5 to 150 g/10 minutes; (ii) a maleic anhydride-grafted polyethylene; and (iii) an inorganic BrŸnsted-Lowry acid having an acid strength pKa value at 25° C. of 1 to 6.5, wherein the polyethylene blend has a 0.03 to 0.5 weight percent of grafted maleic anhydride based on the total weight of the polyethylene blend. Density values are measured according to ASTM D-792.

Ethylene-Based Polymer

The ethylene-based polymer may be an ethylene homopolymer and/or an ethylene copolymer that includes one or more comonomers. The ethylene-based polymer can include greater than 50 wt. % ethylene and, when present, one or more comonomers selected from $C_3$ to $C_{12}$ α-olefins, where the combination of the ethylene and the one or more comonomers, if present, provides for 100 wt. % of the ethylene-based polymer. In one or more embodiments, the α-olefin comonomer units may derive from propylene, 1-butene, 1-pentene, 1-hexene, 4-methyl-1-pentene, 1-octene, 1-decene, and combinations thereof. Examples of suitable ethylene-based polymers include those selected from linear low-density polyethylene (LLDPE), linear medium-density polyethylene (LMDPE), high-density polyethylene (HDPE) and combinations thereof.

LLDPE may be an ethylene homopolymer or a copolymer of ethylene and one or more other α-olefins, as discussed above. LLDPEs intended for use herein may be produced from any suitable catalyst system including conventional Ziegler-Natta type catalyst systems and metallocene based catalyst systems under reaction conditions that are known in the art. In certain embodiments, LLDPE polymers may have a density from about 0.92 g/cm$^3$ to 0.925 g/cm$^3$.

LMDPE may be an ethylene homopolymer or a copolymer of ethylene and one or more other α-olefins, as discussed above. LMDPE intended for use herein may be produced from any suitable catalyst system including conventional Ziegler-Natta type catalyst systems and metallocene based catalyst systems under reaction conditions that are known in the art. In certain embodiments, LMDPE polymers may have a density from about 0.926 g/cm$^3$ to 0.940 g/cm$^3$.

HDPE is available in a wide range of molecular weights as indicated by either MI or HLMI (melt index or high-load melt index) and typically has an ethylene content of at least 99 mole percent (based upon the total moles of HDPE). If incorporated into the HDPE, comonomers may be selected from 1-butene and other $C_3$ to $C_{20}$ alpha olefins. In one embodiment, the comonomers are selected from 1-butene, 4-methyl-1-pentene, 1-hexene, 1-octene and combinations thereof. In certain embodiments, comonomers may be present in the HDPE up to about 1 mole percent, based on the total moles of the HDPE. In further embodiments, comonomers are present in the HDPE up to about 2 mole percent. In some embodiments, the HDPE may have a density from about 0.94 g/cm$^3$ to about 0.97 g/cm$^3$, or from about 0.95 g/cm$^3$ to about 0.965 g/cm$^3$. In the same or other embodiments, the melting point of the HDPE, as measured by a differential scanning calorimeter (DSC), may be from about 120° C. to about 150° C., or from about 125° C. to about 135° C.

HDPE includes polymers made using a variety of catalyst systems including Ziegler-Natta, Phillips-type catalysts, chromium-based catalysts, and metallocene catalyst systems, which may be used with alumoxane and/or ionic activators. Processes useful for preparing such polyethylenes include gas phase, slurry, solution processes, and the like.

The ethylene-based polymer as provided herein also has a melt index, $I_2$, as determined by ASTM D1238 at 190° C. and 2.16 kg of 0.5 to 150 g/10 minutes. Preferably, the ethylene-based polymer has a melt index, $I_2$, from 5 to 50 g/10 minutes, as determined by ASTM D1238 at 190° C. and 2.16 kg. Most preferably, the ethylene-based polymer has a melt index, $I_2$, from 10 to 35 g/10 minutes, as determined by ASTM D1238 at 190° C. and 2.16 kg.

Maleic Anhydride-Grafted Polyethylene

The maleic anhydride-grafted polyethylene may be an ethylene homopolymer and/or an ethylene copolymer that includes one or more comonomers. The maleic anhydride-grafted polyethylene can include greater than 50 wt. % ethylene and, when present, one or more comonomers selected from $C_3$ to $C_{12}$ α-olefins, where the combination of the ethylene and the one or more comonomers, if present, along with the maleic anhydride provides for 100 wt. % of the maleic anhydride-grafted polyethylene. In one or more embodiments, the α-olefin comonomer units may derive from propylene, 1-butene, 1-pentene, 1-hexene, 4-methyl-1-pentene, 1-octene, 1-decene, and combinations thereof.

The maleic anhydride-grafted polyethylene according to the instant disclosure can have a density in the range of 0.865 to 0.970 g/cm³. All individual values and subranges from 0.865 to 0.970 g/cm³ are included herein and disclosed herein; for example, the density can be from a lower limit of 0.870, 0.900, 0.920, 0.940, or 0.950 g/cm³ to an upper limit of 0.970, 0.968, 0.966, 0.965, 0.964 or 0.963 g/cm³. For example, the maleic anhydride-grafted polyethylene may have a density in the range of 0.865 to 0.970 g/cm³; or in the alternative, the polyethylene composition may have a density in the range of 0.865 to 0.970 g/cm³.

The maleic anhydride-grafted polyethylene according to the instant disclosure can also have a melt index ($I_2$) in the range of 0.5 to 150 g/10 minutes as determined by ASTM D1238 at 190° C. and 2.16 kg. All individual values and subranges from 5 to 50 g/10 minutes are included herein and disclosed herein; for example, the melt index ($I_2$) can be from a lower limit of 5, 10, 15, 20 or 25 g/10 minutes, to an upper limit of 50, 45, 40, 35 or 30 g/10 minutes. For example, the maleic anhydride-grafted polyethylene can have a melt index ($I_2$) in the range of 5 to 50 g/10 minutes; or in the alternative, the maleic anhydride-grafted polyethylene can have a melt index ($I_2$) in the range of 5 to 50 g/10 minutes.

In a preferred embodiment, the maleic anhydride-grafted polyethylene has a density in a range of 0.920 g/cm³ to 0.959 g/cm³ and a melt index, $I_2$, as determined by ASTM D1238 at 190° C. and 2.16 kg of 10 to 14 g/10 minutes. More preferably, the maleic anhydride-grafted polyethylene has a density in a range of 0.949 g/cm³ to 0.959 g/cm³ and a melt index, $I_2$, as determined by ASTM D1238 at 190° C. and 2.16 kg of 10 to 14 g/10 minutes.

The maleic anhydride-grafted polyethylene is graphed (e.g., "functionalized") with maleic anhydride. As used herein, the term "grafted" denotes a covalent bonding of the grafting monomer (maleic anhydride) to polymer chains of the polyethylene-based polymer. For the embodiments herein, the maleic anhydride-grafted polyethylene has 0.05 to 3 wt. % of graphed maleic anhydride based on the total weight of the maleic anhydride-grafted polyethylene.

Maleic anhydride functionality can be incorporated into the polymer by grafting or other reaction methods. When grafting, the level of maleic anhydride incorporation is typically 10 percent or below by weight based on the weight of the polymer. Examples of commercially available maleic anhydride functionalized polyethylene include those available under the tradename AMPLIFY™, available from The Dow Chemical Company (Midland, MI, USA), such as AMPLIFY™ GR 204, among others. Other examples of maleic anhydride functionalized polyethylene are available under the tradename FUSABOND™, available from E.I. du Pont de Nemours and Company (Wilmington, DE, USA) such as FUSABOND™ E-100, FUSABONDυ E-158, FUSABOND™ E265, FUSABOND™ E528, FUSABOND™ E-589, FUSABOND™ M-603, among others. Other maleic anhydride functionalized polyethylene polymers, copolymers, and terpolymers may include POLYBOND™ available from Chemtura Corporation (Middlebury, CT, USA), such as POLYBOND™ 3009 and POLYBOND™ 3029, among others; OREVAC™ available from Arkema Group (Colobes, France), such as OREVAC™ 1851 OP, among others; PLEXAR™ LyondellBasell Industries (Houston, TX, USA), such as PLEXAR™ PX-2049; also grades available under the tradename YPAREX™ from B.V. DSM Engineering Plastics (Heerlen, the Netherlands), such as YPAREX™ 8305; and polymers available under the tradename EXXELOR™, available from ExxonMobil Chemical Company (Houston, TX, USA), such as EXXELOR™ PE 1040.

Inorganic Brønsted-Lowry Acid

The polyethylene blend further includes an inorganic Brønsted-Lowry acid having an acid strength pKa value at 25° C. of 1 to 6.5. Preferably, the inorganic Brønsted-Lowry acid has a pKa of 2 to 6. Also preferably, the inorganic Brønsted-Lowry acid is selected from the group consisting of sodium bisulfate monohydrate, phosphoric acid and combinations thereof.

The polyethylene blend of the present disclosure has 0.03 to 0.5 weight percent of grafted maleic anhydride based on the total weight of the polyethylene blend. In a preferred embodiment, the polyethylene blend includes 5 to 75 wt. % of the ethylene-based polymer, 2 to 30 wt. % of the maleic anhydride-grafted polyethylene, and 20 to 10000 parts-per-million of the inorganic Brønsted-Lowry. In another preferred embodiment, the polyethylene blend includes at least 75 wt. % of the ethylene-based polymer, where the maleic anhydride-grafted polyethylene and the inorganic Brønsted-Lowry acid are present with the ethylene-based polymer to provide 100 wt. % of the polyethylene blend. Processing temperatures for forming the sheath from the polyethylene blend of the present disclosure can be from 100° C. to less than 150° C.

The polyethylene blend of the present disclosure can also include a variety of additives, depending upon the intended purpose. For example, the polyethylene blend of the present disclosure can further include a polar saturated fatty acid having a 12 to 21 carbon chain and metal salts thereof. Examples of such polar saturated fatty acids include stearic acid and metal salts thereof. Other additives include, but are not limited to, stabilizers, antioxidants, fillers, colorants, slip agents, fire retardants, plasticizers, pigments, processing aids, tackifying resins and the like. Other additives may include fillers and/or reinforcing materials, such as carbon black, clay, talc, calcium carbonate, mica, silica, silicate, combinations thereof, and the like.

Preparation of Bicomponent Fibers and Fabrics

Bicomponent fibers according to the instant disclosure may be produced via different techniques. Such techniques for forming the bicomponent fiber and products of the biocomponent fiber include melt spinning, a melt blown process, a spunbond process, a staple process, a carded web process, an air laid process, a thermo-calendering process, an adhesive bonding process, a hot air bonding process, a needle punch process, a hydroentangling process and an electrospinning process, where the bicomponent fiber is formed under any of these manufacturing process conditions. Using such manufacturing techniques, the bicomponent fibers of the present disclosure can be formed into a variety of fabrics for a wide variety of potential applications.

Fabrics according to instant disclosure include, but are not limited to, non-woven fabrics, woven fabrics, and combination thereof.

As used herein, "non-woven" fabrics refer to textile materials that have been produced by methods other than weaving. For example, for the non-woven fabrics the bicomponent fibers are processed directly into a planar sheet-like fabric structure and are then bonded chemically, thermally and/or interlocked mechanically to achieve a cohesive fabric. The non-woven fibers and fabrics of the present disclosure can be formed by any method known in the art, such as those mentioned above. Preferably, the non-woven fibers are produced by a meltblown or spunbond process.

The biocomponent fibers of the present disclosure may also be employed in conventional textile processing such as carding, sizing, weaving and the like. Woven fabrics made from the bicomponent fibers of the present invention may also be heat treated to alter the properties of the resulting fabric.

As noted above, a melt spinning process can be used to manufacture the biocomponent fibers. In the melt spinning process, the components used for manufacturing the bicomponent fiber according to the present disclosure are independently melted in an extruder and each of the condensation polymer and the polyethylene blend in their molten state are coextruded under thermally bonding conditions through a spinneret with bi-component fiber spinning nozzles constructed to extrude the molten polymers in such a manner as to form a desired structure, e.g. core-sheath. The extrusion of each polymer through a die to form the bicomponent fiber is accomplished using convention equipment such as, for example, extruders, gear pumps and the like. It is preferred to employ separate extruders, which feed gear pumps to supply the separate molten polymer streams of the bicomponent fiber to the die where the condensation polymer and the polyethylene blend are contacted under thermally bonding conditions to form the bicomponent fiber having a first region with the condensation polymer and a second region with the polyethylene blend. Thermally bonding conditions include operating the extruders for each of the separate molten polymer streams at a temperature of 200° C. to less than 350° C. for the polyester used to form the core, and at a temperature of 100° C. to less than 150° C. for the polyethylene blend used to form the sheath for the bicomponent fiber of the present disclosure. The polyethylene blend according to the present disclosure is preferably mixed in a mixing zone of the extruder and/or in a static mixer, for example, upstream of the gear pump to obtain a more uniform dispersion of the polymer components.

Following extrusion through the die, the bicomponent fiber is taken up in solid form on a godet or another take-up surface. In a bicomponent staple fiber forming process, the bicomponent fibers are taken up on a godet that draws down the fibers in proportion to the speed of the take-up godet. In the spunbond process, the bicomponent fibers are collected in a jet, such as, for example, an air gun, and blown onto a take-up surface such as a roller or moving belt. In the melt blown process, air is ejected at the surface of the spinnerette which serves to simultaneously draw down and cool the bicomponent fibers as they are deposited on a take-up surface in the path of the cooling air.

Regardless of the type of procedure which is used, the bicomponent fibers can be partially melt drawn in a molten state, i.e. before solidification occurs, to help orient the polymer molecules. Melt drawdowns of up to about 1:1000 may be employed depending upon spinnerette die diameter and spinning velocity, preferably from about 1:10 to about 1:200, and especially 1:20 to 1:100.

Where the staple-forming process is employed, it may be desirable to cold draw the bicomponent fibers with conventional drawing equipment, such as, for example, sequential godets operating at differential speeds. The bicomponent fibers may also be heat treated or annealed by employing a heated godet. The bicomponent fibers may further be texturized, such as, for example, by crimping and cutting the bicomponent fibers to form staple. In the spun bonded or air jet processes, cold drawing of the solidified bicomponent fibers and texturizing is achieved in the air jet and by impact on the take-up surface, respectively. Similar texturizing is achieved in the melt blown process by the cooling fluid which is in shear with the molten polymer bicomponent fibers, and which may also randomly de-linearize the bicomponent fibers prior to their solidification.

The bicomponent fibers of the present disclosure can be manufactured in a concentric core-sheath configuration (co-axial configuration). In an additional embodiment, the bicomponent fibers can be manufactured in an eccentric core-sheath configuration. Other possible configurations for the bicomponent fibers also include 50/50 side-by-side, unequal side-by-side, segmented pie and "islands-in-the-sea" configuration, as are known in the art. The bicomponent fibers of the present disclosure can also have a core/sheath ratio of 80/20 to 40/60; for example, a core/sheath ratio of 80/20 to 40/60; or in the alternative, a core/sheath ratio of 70/30 to 40/60; or in the alternative, a core/sheath ratio of 75/25 to 40/60; or in the alternative, a core/sheath ratio of 70/30 to 50/50.

The bicomponent fibers according to the instant disclosure may have a denier per filament in the range of less than 50 g/9000 m. All individual values and subranges from less than 50 g/9000 m are included herein and disclosed herein; for example, the denier per filament can be from a lower limit of 0.1, 0.5, 1, 1.6, 1.8, 2.0. 2.2, 2.4, 5, 10, 15, 17, 20, 25, 30, 33, 40, or 44 g/9000 m to an upper limit of 0.5, 1, 1.7, 1.8, 1.9, 2.0, 2.1, 2.2, 2.3, 2.4, 5, 10, 15, 17, 20, 25, 30, 33, 40, 44, or 50 g/9000 m. For example, the bicomponent fibers may have a denier per filament in the range of less than 40 g/9000 m; or in the alternative, the bicomponent fibers may have a denier per filament in the range of from 0.1 to 10 g/9000 m; or in the alternative, the bicomponent fibers may have a denier per filament in the range of from 1 to 5 g/9000 m; or in the alternative, the bicomponent fibers may have a denier per filament in the range of from 0.1 to 5 g/9000 m; or in the alternative, the bicomponent fibers may have a denier per filament in the range of from 0.1 to 2.6 g/9000 m; or in the alternative, the bicomponent fibers may have a denier per filament in the range of from 1 to 3 g/9000 m; or in the alternative, the bicomponent fibers may have a denier per filament in the range of from 1 to 2.5 g/9000 m; or in the alternative, the bicomponent fibers may have a denier per filament in the range of from 1.5 to 3 g/9000 m; or in the alternative, the bicomponent fibers may have a denier per filament in the range of from 1.6 to 2.4 g/9000 m.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items.

EXAMPLES

Materials

Eastman™ Polyester F61HC (PET-A)—Polyethylene terephthalate (a condensation polymer) available from Eastman Chemical Company.

AMPLIFY™ GR 204 (The Dow Chemical Company. TDCC). A maleic anhydride modified HDPE having greater than 0.1 wt. % MAH. Melt Index ($I_2$) of 12.0 measured at 190° C./2.16 kg, g/10 min according to ASTM D 1238. Density of 0.954 g/cm³ measured according to ASTM D 792.

ASPUN™ 6835 (TDCC). An ethylene-based polymer (an ethylene/1-octene LLDPE copolymer) having a melt Index ($I_2$) of 17.0 measured at 190° C./2.16 kg, g/10 min according to ASTM D 1238. Density of 0.950 g/cm³ measured according to ASTM D 792.

Sodium Bisulfate (Sigma Aldrich). An inorganic Brønsted-Lowry acid having a pKa at 25° C. of 2 in an aqueous system.

Fiber Spinning

Prepare the bicomponent fibers of the Examples and Comparative Examples provided herein according to the information provided in Table 1, below. For Example 1, form a masterbatch mix with the catalyst (sodium bisulfate) and mineral oil and blend with the polymer (AMPLIFY™ GR 204) of the polyethylene blend (Table 1) to facilitate surface adhesion of the catalyst to the polyolefin pellets. Add the masterbatch to provide 20 wt. % of the polyethylene blend to the ASPUN™ 6835 as seen in the amounts shown in Table 1. Final blend composition was used directly on fiber spinning line.

Each of the bicomponent fibers of the Example and Comparative Examples has a core/sheath configuration using PET as the core and the polyethylene blend as shown in Table 1 as the sheath. The bicomponent fibers of the Example and Comparative Examples were handled and prepared in the same manner.

Produce the bicomponent fibers on a bicomponent spinning installation with a concentric cross-section having the PET as the core and the polyethylene blend as shown in Table 1 as the sheath. Mix the components of the polyethylene blend in the sheath extruder. The total throughput, at a core/sheath ratio of 40/60, was 0.6 gram per hole per minute (GHM), hole size (core) of 0.6 mm, and a length to diameter ratio of 4.

Maintain the sheath extruder melt temperature at 240° C. and the core extruder melt temperature at 290° C. Quench the bicomponent filaments with air at 15° C. Set the quench ratio to 60% at 600 cfm. Adjust the draw ratio to maximum pressure handle in the slot before fiber break. The filament speed seen in Table 1 and Table 2 are maximum filament speed values above which the filament breaks.

TABLE 1

| | Condensation Polymer (Core) | Polyethylene Blend (Sheath) | Core-Sheath ratio | Denier | Filament speed (m/min) |
|---|---|---|---|---|---|
| Comp Ex. A | F61HC PET | ASPUN™ 6835 | 40/60 | 1.75 | 3000 |
| Comp Ex. B | F61HC PET | ASPUN™ 6835 + 20 wt. %[1] AMPLIFY™ GR 204 | 40/60 | 1.4 | 3700 |
| Ex. 1 | F61HC PET | ASPUN™ 6835 + 20 wt. %[1] AMPLIFY™ GR 204 + 2000 ppm Sodium Bisulfate | 40/60 | 1.2 | 4200 |

[1]Weight percent (wt. %) based on total weight of Polyethylene blend, where the components identified in Table 1 for each Comparative Example and Example total 100 wt. %.

The data shown in Table 1 indicate that the polyethylene blend of the present disclosure can achieve a higher filament speed as compared to polyethylene blends that do not include all the components of the polyethylene blend according to the present disclosure. In addition, as seen in Table 1 in addition to a higher filament speed, the polyethylene blend of the present disclosure also helps to achieve a fiber with a lower denier value as compared to polyethylene blends that do not include all the components of the polyethylene blend according to the present disclosure.

What is claimed is:

1. A bicomponent fiber, comprising:
   a first region formed of a condensation polymer; and
   a second region formed from a polyethylene blend of:
   (i) an ethylene-based polymer having a density of 0.920 g/cm³ to 0.970 g/cm³ and a melt index, $I_2$, as determined by ASTM D1238 at 190° C. and 2.16 kg of 0.5 to 150 g/10 minutes;
   (ii) a maleic anhydride-grafted polyethylene, and
   each ethylene-based polymer and each polyethylene in the polyethylene blend has a density from 0.920 g/cm³ to 0.970 g/cm³;
   and
   (iii) an inorganic Bronsted-Lowry acid having an acid strength pKa value at 25° C. of 1 to 6.5, wherein the inorganic Bronsted-Lowry acid is selected from the group consisting of sodium bisulfate monohydrate, phosphoric acid and combinations thereof; and wherein the polyethylene blend has a 0.03 to 0.5 weight percent of grafted maleic anhydride based on the total weight of the polyethylene blend.

2. The bicomponent fiber of claim 1, wherein the first region is a core region of the bicomponent fiber, and the second region is a sheath region of the bicomponent fiber, where the sheath region surrounds the core region.

3. The bicomponent fiber of claim 1, wherein the condensation polymer is selected from the group consisting of polyethylene terephthalate, polyethylene terephthalate glycol-modified, polybutylene terephthalate, polylactic acid, polytrimethylene terephthalate, polyethylene 2,5-furandicarboxylate, polyhydroxybutyrate, polyamide and combinations thereof.

4. The bicomponent fiber of claim 3, wherein the condensation polymer comprises at least 75 weight percent (wt. %) of the first region, wherein the wt. % is based on the total weight of the first region.

5. The bicomponent fiber of claim 1, wherein the condensation polymer is selected from the group consisting of polyethylene terephthalate, polyethylene terephthalate glycol-modified, polybutylene terephthalate and combinations thereof.

6. The bicomponent fiber of claim 1, wherein the ethylene-based polymer is selected from linear low-density polyethylene, linear medium-density polyethylene, high-density polyethylene and combinations thereof.

7. The bicomponent fiber of claim 1, wherein the maleic anhydride-grafted polyethylene has 0.05 to 3 wt. % of graphed maleic anhydride based on the total weight of the maleic anhydride-grafted polyethylene.

8. The bicomponent fiber of claim 7, wherein the maleic anhydride-grafted polyethylene has a density in a range of 0.920 g/cm$^3$ to 0.959 g/cm$^3$ and a melt index, $I_2$, as determined by ASTM D1238 at 190° C. and 2.16 kg of 10 to 14 g/10 minutes.

9. The bicomponent fiber of claim 1, wherein the inorganic Bronsted-Lowry acid has a pKa of 2 to 6.

10. The bicomponent fiber of claim 1, wherein the polyethylene blend includes 5 to 75 wt. % of the ethylene-based polymer, 2 to 30 wt. % of the maleic anhydride-grafted polyethylene, and 20 to 10000 parts-per-million of the inorganic Bronsted-Lowry acid.

11. The bicomponent fiber of claim 1, wherein the polyethylene blend includes at least 75 wt. % of the ethylene-based polymer, wherein the maleic anhydride-grafted polyethylene and the inorganic Bronsted-Lowry acid are present with the ethylene-based polymer to provide 100 wt. % of the second region.

12. The bicomponent fiber of claim 1, wherein the polyethylene blend further includes a polar saturated fatty acid having a 12 to 21 carbon chain and metal salts thereof.

13. The bicomponent fiber of claim 12, wherein the polar saturated fatty acid is stearic acid and metal salts thereof.

14. A nonwoven article comprising the bicomponent fiber of claim 1.

15. The bicomponent fiber of claim 1 wherein the ethylene-based polymer and the polyethylene and in the polyethylene blend consist of polyethylenes having a density from 0.920 g/cm$^3$ to 0.970 g/cm$^3$.

16. A bicomponent fiber comprising:
a first region formed of a condensation polymer; and
a second region formed from a polyethylene blend of
  (i) an ethylene-based polymer having a density from 0.920 g/cm$^3$ to 0.970 g/cm$^3$ and a melt index, $I_2$, as determined by ASTM D1238 at 190° C. and 2.16 kg from 0.5 to 150 g/10 minutes;
  (ii) a maleic anhydride-grafted polyethylene with a base ethylene-based polymer,
  the ethylene-based polymer of (i) and the base ethylene-based polymer of (ii) each consisting of
   (a) ethylene and
   (b) an optional C3-C12 α-olefin comonomer; and
  (iii) an inorganic Bronsted-Lowry acid having an acid strength pKa value at 25° C. of 1 to 6.5, wherein the inorganic Bronsted-Lowry acid is selected from the group consisting of sodium bisulfate monohydrate, phosphoric acid and combinations thereof, and wherein the polyethylene blend has a 0.03 to 0.5 weight percent of grafted maleic anhydride based on the total weight of the polyethylene blend.

17. The bicomponent fiber of claim 16 wherein the ethylene-based polymer in (i) and the base ethylene-based polymer in (ii) each consists of
  (a) ethylene and
  (b) a $C_3$-$C_{12}$ α-olefin comonomer.

18. The bicomponent fiber of claim 17 wherein the ethylene-based polymer in (i) and the base ethylene-based polymer in (ii) each has a density from 0.920 g/cm$^3$ to 0.970 g/cm$^3$.

19. A bicomponent fiber comprising:
a first region formed of a condensation polymer; and
a second region formed from a polyethylene blend of
  (i) an ethylene-based polymer having a density from 0.920 g/cm$^3$ to 0.970 g/cm$^3$ and a melt index, $I_2$, as determined by ASTM D1238 at 190° C. and 2.16 kg from 0.5 to 150 g/10 minutes;
  (ii) from 0.03 wt % to 0.5 wt % of a maleic anhydride-grafted polyethylene; and
  (iii) sodium bisulfate, wherein weight percent is based on the total weight of the polyethylene blend.

* * * * *